(12) United States Patent
Jones

(10) Patent No.: US 7,419,643 B1
(45) Date of Patent: Sep. 2, 2008

(54) METHODS AND APPARATUS FOR RECOVERING GYPSUM AND MAGNESIUM HYDROXIDE PRODUCTS

(75) Inventor: Dennis K. Jones, Williamstown, WV (US)

(73) Assignee: Allegheny Energy, Inc., Greensburg, PA (US)

(*) Notice: Subject to any disclaimer, the term of this patent is extended or adjusted under 35 U.S.C. 154(b) by 87 days.

(21) Appl. No.: 11/656,701

(22) Filed: Jan. 23, 2007

Related U.S. Application Data

(62) Division of application No. 11/324,620, filed on Jan. 3, 2006, now Pat. No. 7,179,438.

(60) Provisional application No. 60/673,033, filed on Apr. 20, 2005.

(51) Int. Cl.
| | |
|---|---|
| B01J 8/04 | (2006.01) |
| B01J 8/08 | (2006.01) |
| B01D 50/00 | (2006.01) |
| B01D 47/00 | (2006.01) |
| B01D 53/56 | (2006.01) |
| C01F 1/00 | (2006.01) |

(52) U.S. Cl. .................. 422/188; 422/168; 422/170; 422/187; 422/189; 422/224; 422/232; 422/234; 423/155; 423/210; 423/242.1

(58) Field of Classification Search .................. 422/168, 422/170, 187, 188, 189, 224, 232, 234; 423/155, 423/210, 242.1
See application file for complete search history.

(56) References Cited

U.S. PATENT DOCUMENTS

| | | | |
|---|---|---|---|
| 4,867,961 A | 9/1989 | Palmer | |
| 4,874,591 A | 10/1989 | Jeney | |
| 5,084,225 A | 1/1992 | Ishigaki et al. | |
| 5,270,026 A | 12/1993 | College et al. | |
| 5,614,158 A | 3/1997 | College | |
| 5,676,915 A | 10/1997 | Iiyama et al. | |
| 6,214,313 B1 | 4/2001 | Berisko et al. | |
| 6,572,832 B2 * | 6/2003 | Smith | 423/243.08 |

FOREIGN PATENT DOCUMENTS

JP  1222524  9/1989

* cited by examiner

Primary Examiner—Walter D. Griffin
Assistant Examiner—Lessanework T Seifu
(74) Attorney, Agent, or Firm—Arnold B. Silverman; Eckert Seamans Cherin & Mellott, LLC

(57) ABSTRACT

The present invention provides methods and apparatus for treating flue gas containing sulfur dioxide using a scrubber, and more particularly relates to recovering gypsum and magnesium hydroxide products from the scrubber blowdown. The gypsum and magnesium hydroxide products are created using two separate precipitation reactions. Gypsum is crystallized when magnesium sulfate reacts with calcium chloride. Magnesium hydroxide is precipitated when magnesium chloride from the gypsum crystallization process reacts with calcium hydroxide. The process produces a high quality gypsum with a controllable pH and particle size distribution, as well as high quality magnesium hydroxide.

31 Claims, 1 Drawing Sheet

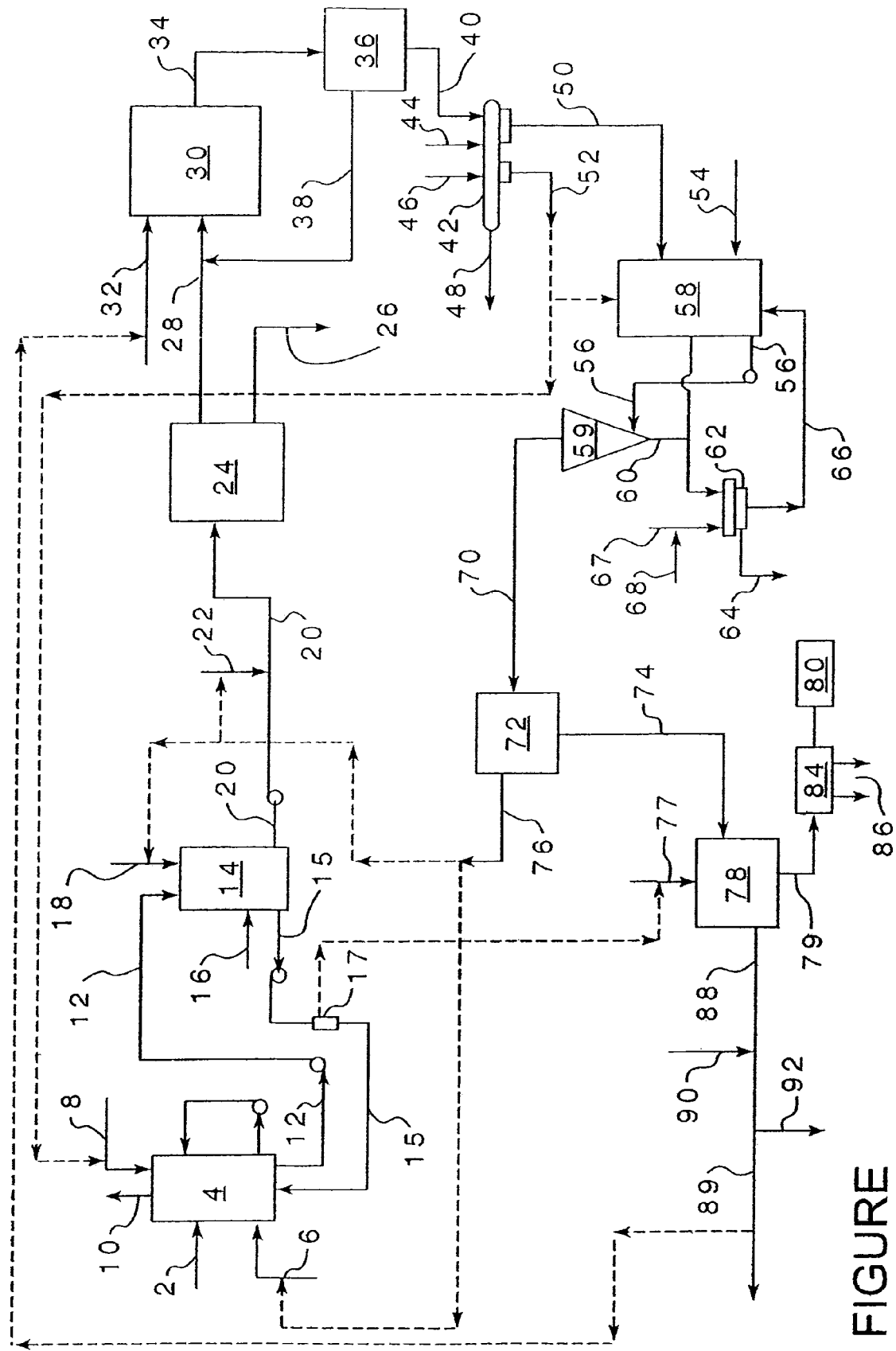
FIGURE

METHODS AND APPARATUS FOR RECOVERING GYPSUM AND MAGNESIUM HYDROXIDE PRODUCTS

CROSS-REFERENCE TO RELATED APPLICATION

This application claims the benefit of U.S. Traditional patent application Ser. No. 11/324,620 filed Jan. 3, 2006, entitled: "METHODS AND APPARATUS FOR RECOVERING GYPSUM AND MAGNESIUM HYDROXIDE PRODUCTS" and U.S. Provisional Patent Application Ser. No. 60/673,033 filed Apr. 20, 2005, entitled: "METHODS AND APPARATUS FOR RECOVERING GYPSUM AND MAGNESIUM HYDROXIDE PRODUCTS".

FIELD OF THE INVENTION

The present invention relates to methods and apparatus for treating flue gas containing sulfur dioxide using a scrubber, and more particularly relates to recovering gypsum and magnesium hydroxide products from the scrubber blowdown.

BACKGROUND INFORMATION

Coal and oil fired power plants produce flue gas that contains sulfur dioxide. Limestone (calcium carbonate) and lime (calcium hydroxide) are the traditional sources of alkalinity for scrubbing the flue gas from coal fired power plants. The purity of gypsum produced from a limestone-based scrubbing system varies between about 85 to 95 percent, with 90 percent being typical. The gypsum purity from other lime-based scrubbing systems ranges from about 94 to 98 percent. The pH of gypsum produced from a limestone-based scrubbing system is usually between about 6.0 and 8.0, which is a desirable range for producing wallboard. However, the pH of gypsum produced from lime-based scrubbing systems can exceed 8.0, making the gypsum unsuitable for wallboard production without further processing. The particle size distribution of the gypsum produced from limestone-based scrubbing systems is usually a narrow range of about 10 to 70 microns, whereas the gypsum produced from lime-based scrubbing systems is a broad range of about 10 to 200 microns. A narrow range of particle size distribution is desirable for the production of wallboard. Lime-based scrubbing systems typically have a lower initial installation cost and a higher sulfur dioxide removal efficiency. However, the gypsum produced from a lime-based scrubbing process is generally not suitable for use without further processing such as pH adjustment, treatment with chemical modifiers, or grinding and/or screening.

In lieu of a limestone or lime-based scrubbing system, flue gas containing sulfur dioxide may be treated by passing it through a scrubbing unit that utilizes a magnesium-containing scrubbing agent, e.g., a magnesium hydroxide slurry. The magnesium hydroxide reacts with sulfur dioxide to produce magnesium sulfite and magnesium bisulfite. The magnesium hydroxide slurry also reacts with hydrochloric acid in the flue gas, producing magnesium chloride, although there is very little hydrochloric acid in the flue gas compared to sulfur dioxide. The following chemical reactions occur in the scrubbing unit:

$$SO_2 + Mg(OH)_2 \rightarrow MgSO_3 + H_2O \quad (1)$$

$$H_2O + SO_2 + MgSO_3 \rightarrow Mg(HSO_3)_2 \quad (2)$$

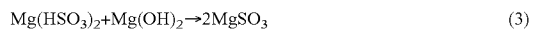

$$Mg(HSO_3)_2 + Mg(OH)_2 \rightarrow 2MgSO_3 \quad (3)$$

$$2HCl + Mg(OH)_2 \rightarrow MgCl_2 + 2H_2O \quad (4)$$

The blowdown from the scrubbing unit contains magnesium sulfite and magnesium bisulfite. Several processes have been developed to convert this blowdown into valuable products that can be collected for sale or further use, namely, gypsum and magnesium hydroxide. Gypsum may be used to make wallboard and as a soil conditioner on large tracts of land in suburban areas as well as agricultural regions. Magnesium hydroxide is a chemical reagent grade material that may be used for pH neutralization in water treatment, and $SO_3$ removal and boiler slag prevention in coal fired power plants. The purity of magnesium hydroxide generally ranges from about 85 to 95 percent, and most magnesium hydroxide that is sold has a purity ranging from about 88 to 92 percent.

One method for treating flue gas containing sulfur dioxide is marketed by Dravo Lime Company as the ThioClear® process. A wet scrubber with a magnesium hydroxide scrubbing agent is utilized to remove sulfur dioxide from the flue gas. The blowdown from the scrubber passes through an oxidation unit where magnesium sulfite and magnesium bisulfite are converted to magnesium sulfate. Bleed from the oxidation unit is reacted with a slaked lime slurry to crystallize gypsum and magnesium hydroxide particles in a regeneration tank. Thus, the process converts magnesium sulfate blowdown to gypsum and magnesium hydroxide using calcium hydroxide in a single chemical reaction.

U.S. Pat. No. 4,874,591 to Jeney discloses a process for the purification of waste gas containing hydrochloric acid and sulfur dioxide. The waste gas is contacted with a magnesium-containing scrubbing agent, e.g., a magnesium hydroxide suspension, to generate reaction products. A calcium-containing reagent, e.g., calcium chloride, is introduced to the reaction products to precipitate gypsum and generate a chloride-containing liquid. The liquid undergoes pyrohydrolysis to produce a stream of magnesium hydroxide, which is recirculated to the scrubber, and a stream of hydrochloric acid, which is recovered for use in other applications.

Japanese Patent No. JP1222524A to Morita discloses a treatment process for waste water containing magnesium sulfate. The wastewater is mixed with calcium chloride to form a gypsum product that is separated out using a filter press. Calcium hydroxide is added to the separated filtrate to form magnesium hydroxide in a reaction tank. The reaction product is separated into magnesium hydroxide and a filtrate by a filter press, and the magnesium hydroxide is used as the adsorbent for wet desulfurization. Part of the filtrate is sent to a water tank containing calcium chloride and part is sent to a reverse osmosis unit. Water containing calcium chloride from the reverse osmosis unit is recycled into the water tank. Magnesium hydroxide from the reverse osmosis unit is used in a slurry tank containing aqueous magnesium hydroxide slurry.

Because gypsum and magnesium hydroxide represent valuable products, there exists a need for new systems that are capable of efficiently converting scrubber blowdown into these substances. While the prior art provides methods for generating these substances using a magnesium-containing scrubbing agent, new methods could improve the efficiency of existing systems, the quality of the gypsum and magnesium hydroxide produced, and the ability to control pH and particle size distribution.

SUMMARY OF THE INVENTION

The present invention in a preferred embodiment provides methods and apparatus for treating flue gas containing sulfur dioxide and hydrochloric acid using a scrubber, and more particularly relates to recovering gypsum and magnesium hydroxide products from the scrubber blowdown. The gypsum and magnesium hydroxide products may be created using two separate precipitation reactions. Gypsum is crystallized when magnesium sulfate reacts with calcium chloride. Magnesium hydroxide is precipitated when magnesium chloride from the gypsum crystallization process reacts with calcium hydroxide. Because of the separate precipitation reactions and other features discussed below, the process produces a high purity gypsum with a controllable pH and particle size distribution, as well as high quality magnesium hydroxide.

An aspect of the present invention in a preferred embodiment is to provide a method for recovering gypsum product and magnesium hydroxide product from flue gas containing sulfur dioxide, the method comprising: treating the flue gas containing sulfur dioxide with a magnesium hydroxide slurry to produce magnesium sulfite and magnesium bisulfite; oxidizing the magnesium sulfite and magnesium bisulfite by reaction with air and magnesium hydroxide; producing magnesium sulfate blowdown from the oxidized magnesium sulfite and magnesium bisulfite; reacting the magnesium sulfate blowdown with calcium chloride to produce a gypsum slurry; removing gypsum fines from the gypsum slurry; washing the gypsum slurry after the gypsum fines are removed to produce gypsum product, a magnesium chloride filtrate, and a residual stream; reacting the magnesium chloride filtrate with calcium hydroxide to produce a magnesium hydroxide slurry; removing grit and unreacted calcium hydroxide from the magnesium hydroxide slurry to form a treated magnesium hydroxide slurry; and purifying the treated magnesium hydroxide slurry to produce a magnesium hydroxide product and a calcium chloride solution.

Another aspect of the present invention in a preferred embodiment is to provide an apparatus for recovering gypsum product and magnesium hydroxide product from flue gas containing sulfur dioxide, the apparatus comprising: a scrubber for removing sulfur dioxide from the flue gas and producing magnesium sulfite and magnesium bisulfite, wherein said apparatus is structured for oxidizing the magnesium sulfite and magnesium bisulfite by reaction with air and magnesium hydroxide to produce magnesium sulfate blowdown; a gypsum crystallization unit for reacting the magnesium sulfate blowdown with calcium chloride to produce gypsum slurry; a gypsum fines separation unit for removing gypsum fines from the gypsum slurry; a dewatering filter belt for washing the gypsum slurry after the gypsum fines are removed to produce gypsum product, a magnesium chloride filtrate, and a residual stream; a magnesium hydroxide production vessel for reacting the magnesium chloride filtrate with calcium hydroxide to produce magnesium hydroxide slurry; a grit removal unit for removing grit and unreacted calcium hydroxide from the magnesium hydroxide slurry to produce a treated magnesium hydroxide slurry; and a magnesium hydroxide purification unit for purifying the treated magnesium hydroxide slurry to produce a magnesium hydroxide product and a calcium chloride solution.

An object of the present invention is to improve the efficiency of existing systems that treat flue gas using a magnesium-containing scrubbing agent.

Another object of the present invention is to produce high quality gypsum and magnesium hydroxide products from the treatment of flue gas containing sulfur dioxide.

A further object of the present invention is to generate gypsum and magnesium hydroxide products using two separate precipitation reactions.

Another object of the present invention is to provide control of pH and particle size distribution for gypsum product that is produced.

These and other objects of the present invention will become more readily apparent from the following detailed description and appended claims.

FIGURE

The FIGURE is a process flow diagram in accordance with a preferred embodiment of the present invention.

DETAILED DESCRIPTION OF THE PREFERRED EMBODIMENTS

The present invention provides methods and apparatus for treating flue gas containing sulfur dioxide and a small amount of hydrochloric acid using a scrubber, and more particularly relates to recovering gypsum and magnesium hydroxide products from the scrubber blowdown. The gypsum and magnesium hydroxide products are created using two separate precipitation reactions. Gypsum is crystallized when magnesium sulfate reacts with calcium chloride. Magnesium hydroxide is precipitated when magnesium chloride from the gypsum crystallization process reacts with calcium hydroxide. Because of the separate precipitation reactions and other features discussed below, the process produces high quality gypsum with a controllable pH and particle size distribution, as well as high quality magnesium hydroxide. The quality or purity of the gypsum produced may range from about 95 to about 100 percent. In a preferred embodiment, the gypsum quality ranges from about 97 to about 100 percent. The purity of the magnesium hydroxide produced may range from about 85 to 95 percent, and preferably ranges from about 90 to 95 percent.

In one embodiment of the present invention, a scrubber may be utilized to treat sulfur dioxide-containing flue gas using a magnesium-containing scrubbing agent. Suitable magnesium-containing scrubbing agents include magnesium hydroxide slurry. The scrubber blowdown, which contains magnesium sulfite and magnesium bisulfite, passes through an oxidation unit that converts sulfite to sulfate, generating magnesium sulfate in the blowdown of the oxidation unit. The magnesium sulfate blowdown travels through a purification unit where inert material is removed. The purification unit outputs a magnesium sulfate solution that reacts with a calcium chloride solution in a gypsum crystallization unit. The crystallization unit produces gypsum slurry which passes through a separation unit where gypsum fines are separated and recycled to the crystallization unit. The gypsum slurry then passes through a dewatering filter belt and gypsum product is produced for collection. The magnesium chloride filtrate moves to a magnesium hydroxide production vessel where it reacts with calcium hydroxide to form a magnesium hydroxide slurry. The magnesium hydroxide slurry passes through a grit removal unit such as a hydroclone, then through a purification unit for removal of calcium chloride, which is recirculated to the gypsum crystallization unit. The purified magnesium hydroxide is recirculated to the scrubber or collected for use in other applications.

The FIGURE presents a process flow diagram in accordance with a preferred embodiment of the present invention. Flue gas 2 containing sulfur dioxide and hydrochloric acid is diverted to a scrubber 4 that utilizes magnesium hydroxide slurry 6 as a scrubbing agent and water 8. Sulfur dioxide is removed from the flue gas according to the following reactions:

$$SO_2 + Mg(OH)_2 \rightarrow MgSO_3 + H_2O \qquad (1)$$

$$H_2O + SO_2 + MgSO_3 \rightarrow Mg(HSO_3)_2 \qquad (2)$$

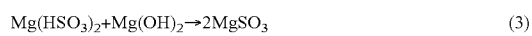
$$Mg(HSO_3)_2 + Mg(OH)_2 \rightarrow 2MgSO_3 \qquad (3)$$

$$2HCl + Mg(OH)_2 \rightarrow MgCl_2 + 2H_2O \qquad (4)$$

Once the sulfur dioxide is removed, the scrubbed flue gas 10 exits the scrubber 4 along with some evaporated water. A solution containing magnesium sulfite and magnesium bisulfite is generated by the scrubbing process. Although the concentration of total sulfites (magnesium sulfite and magnesium bisulfite) in this solution may vary, the concentration in the scrubber may range from about 15,000 to 21,000 mg/L. A blowdown 12 of the magnesium sulfite and magnesium bisulfite solution (referred to herein as "magnesium sulfite/bisulfite blowdown") exits the scrubber 4 and proceeds to an oxidation unit 14.

The amount of magnesium hydroxide slurry 6 added to the scrubber 4 is adjusted to control the pH of the magnesium sulfite/bisulfite blowdown 12. The pH of the blowdown 12 is preferably maintained at about 6.0 to 6.2, although the present invention is not limited to any particular pH. The pH within the scrubber 4 preferably ranges from about 5.8 to 6.5, although this pH may vary as well. The volume of continuous blowdown 12 may be controlled to maintain a constant sulfite concentration in the scrubber 4. In a preferred embodiment, the flow rate of the blowdown 12 is proportional to the volume of magnesium hydroxide slurry 6 entering the scrubber 4.

The oxidation unit 14 inputs air 16 and magnesium hydroxide slurry 18 to convert the magnesium sulfite/bisulfite blowdown 12 into magnesium sulfate. The conversion proceeds according to the following reactions:

$$MgSO_3 + \tfrac{1}{2}O_2 \rightarrow MgSO_4 \qquad (5)$$

$$Mg(HSO_3)_2 + O_2 \rightarrow MgSO_4 + H_2SO_4 \qquad (6)$$

$$H_2SO_4 + Mg(OH)_2 \rightarrow MgSO_4 + 2H_2O \qquad (7)$$

Although the present invention is not limited to any particular concentration of magnesium sulfate, the concentration in the oxidation unit 14 may range from about 150,000 to 400,000 mg/L.

Because the oxidation of magnesium sulfite/bisulfite produces sulfuric acid, magnesium hydroxide slurry 18 is fed to the oxidation unit 14 to control the pH of magnesium sulfate produced. It is preferable if the magnesium hydroxide slurry 18 is fed to the oxidation unit 14 at a pH ranging from about 5.0 to 5.5. It is also preferable if the pH in the oxidation unit 14 ranges from about 5.0 to 6.4. However, the present invention is not limited to any particular pH value.

The oxidation unit 14 produces a stream of magnesium sulfate 15 that may be recirculated to the scrubber 4. Since the oxidation of magnesium sulfite/bisulfite to magnesium sulfate is an exothermic reaction, the excess heat can be extracted from this stream with a heat exchanger 17 and used as a heat source for a calcium chloride concentration unit 78 in a manner discussed hereinafter. The recirculated stream of magnesium sulfate 15 increases the concentration of magnesium sulfate in the scrubber/oxidizer circuit, which reduces the size and cost of equipment that is ultimately required to produce gypsum.

In addition to the recirculated stream of magnesium sulfate 15, a portion of the magnesium sulfate is removed from the oxidation unit 14 as magnesium sulfate blowdown 20. The amount of blowdown 20 may be adjusted to maintain the concentration of magnesium sulfate below saturation levels. The flow of magnesium sulfate blowdown 20 may be controlled by measuring the conductivity of the recirculated stream of magnesium sulfate 15 since the magnesium sulfate is the major constituent of the recirculated stream.

To achieve the desired pH of the final gypsum product (about 5.0 to 8.0 for wallboard production, for example), the pH of the magnesium sulfate blowdown 20 may be controlled. This pH can be controlled by adjusting the amount of magnesium hydroxide slurry 18 that enters the oxidation unit 14. In addition, the pH can be controlled by introducing additional magnesium hydroxide 22 to the process stream if necessary.

The magnesium sulfate blowdown 20 is delivered to a magnesium sulfate purification unit 24 such as a thickener, filter, or centrifuge to remove any inert material, calcium sulfate, fly ash, or unburned carbon that enters the process with the flue gas, makeup water, or lime slurry. Inert material may include iron oxide, aluminum oxide, or silica oxide. Removal of this material improves the purity of the final gypsum product. In lieu of the purification unit 24, the magnesium sulfate blowdown 20 may be sent to a surge tank (not shown) or directly to the gypsum crystallization unit 30. A surge tank may be incorporated between the oxidation unit 14 and the gypsum crystallization unit 30 to maintain the process flow at a controlled, constant rate. This could reduce the size of the downstream equipment if the amount of magnesium sulfate blowdown 20 varied due to station loading.

The solids 26 that are separated out in the purification unit 24 may be sent to a landfill for disposal. A magnesium sulfate solution 28 exits the purification unit 24 and enters a gypsum crystallization unit 30, where the magnesium sulfate is mixed with calcium chloride 32. The chemical reaction proceeds as follows:

$$MgSO_4 + CaCl_2 \rightarrow CaSO_4\downarrow + MgCl_2 \qquad (8)$$

The gypsum crystallization unit 30 is designed to produce crystals with the desired particle size distribution. In a reaction type crystallization unit, particles of varying sizes can be made. The particles are usually separated using an upward solution flow. Gravity pushes the larger particles to the bottom, while the gypsum product and smaller particles move to the top. The larger particles are pulled from the bottom and the smaller particles are either left in the gypsum crystallization unit 30 to continue to grow or are used as "seed" material. The rate of the upward solution flow determines the final maximum particle size. Although the present invention is not limited to any particular particle size distribution, the gypsum crystallization unit 30 may be designed to produce a product with about 95 percent of the particles in a narrow range, for example, about 20-100 microns, which is desirable for the production of wallboard. However, the gypsum crystallization unit 30 may also be designed to achieve a particle size distribution that is even narrower than 20-100 microns if desired. Alternatively, a broad range, for example, about 10-290 microns, may be produced.

In one embodiment, an excess of calcium chloride 32 may be mixed with the magnesium sulfate solution 28 in the gypsum crystallization unit 30 so that all of the sulfate, or a majority of the sulfate, reacts and is removed.

After crystallization, gypsum slurry 34 leaves the gypsum crystallization unit 30 and enters a gypsum fines separation unit 36. The gypsum fines 38 are recirculated to the gypsum crystallization unit 30. The concentration of gypsum solids in the gypsum crystallization unit 30 is preferably maintained at a minimum of about 30 percent solids and a maximum of about 40 percent solids.

The gypsum slurry 40 exits the gypsum fines separation unit 36 and proceeds to a dewatering filter belt 42. The gypsum slurry is washed one or more times with water or some other suitable liquid, which leaves behind a high quality gypsum product 48 that may be collected for sale or further use. In a preferred embodiment, the gypsum slurry is washed twice. The first wash 44 generates a magnesium chloride filtrate 50 that contains residual water from the washing process and magnesium chloride from the crystallization of gypsum. The second wash 46 generates a residual stream 52 that can be sent for waste water treatment and disposal, or more preferably, can be recirculated back to the scrubber 4. Since the residual stream 52 will contain some magnesium chloride, returning it to the scrubber will preserve the magnesium and chloride within the process. The residual stream 52 can also go to a magnesium hydroxide production vessel 58 if desired.

The magnesium chloride filtrate 50 is sent to a magnesium hydroxide production vessel 58 where it is mixed with calcium hydroxide 54. Depending on the design of the gypsum crystallization unit 30, a portion of the magnesium chloride filtrate 50 can be recirculated back and blended with the magnesium sulfate solution 28 that enters the gypsum crystallization unit 30.

The following reaction occurs within the magnesium hydroxide production vessel 58:

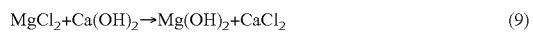

$$MgCl_2 + Ca(OH)_2 \rightarrow Mg(OH)_2 + CaCl_2 \qquad (9)$$

The calcium hydroxide 54 that is fed to the production vessel 58 may be supplied in the form of a lime slurry $(Ca(OH)_2)$. It is preferable for the slurry to contain a minimum of about 0.5 percent magnesium in the form of magnesium oxide or magnesium hydroxide to compensate for losses of magnesium throughout the system. Magnesium oxide may be added to the lime or it may be naturally occurring in the limestone from which the lime is made. Dolomitic lime which contains up to 30 percent magnesium oxide may be used. If lime containing no magnesium hydroxide is used, then magnesium hydroxide will need to be added to the process. It is desirable for the calcium hydroxide 54 lime slurry to have a total solids content ranging from about 15 to 20%, although the present invention is not limited to any particular total solids content.

The production vessel 58 generates a magnesium hydroxide slurry 56 that also contains calcium chloride. Although the present invention is not limited to any particular pH, the pH in the production vessel 58 may be maintained in the range of about 8.8 to 9.9 to ensure that all or a majority of the calcium hydroxide is reacted, and little or no calcium hydroxide remains in the stream leaving the production vessel 58. However, a small amount of unreacted magnesium chloride in the magnesium hydroxide slurry 56 may be acceptable. The pH may vary depending on unknown factors such as contaminants in the lime slurry, reaction vessel design, pH measuring point, and flow rates.

In a preferred embodiment, the magnesium hydroxide production 58 is large enough to provide a four to six hour retention time to ensure adequate time to react the calcium hydroxide 54 with the magnesium chloride 50 and to prevent downstream scaling.

The magnesium hydroxide slurry 56 may be pumped through a grit removal unit 59, for example, a hydroclone cluster, to remove any grit or unreacted lime particles. Although the description contained herein primarily refers to the use of hydroclones, it is to be understood that the present invention also contemplates the use of other, similar grit removal devices, e.g., screens, provided that the separation unit does not add any additional water to the process. The hydroclone underflow 60 is returned to the magnesium hydroxide production vessel 58 in the form of filtrate 66. Alternatively, or periodically, the hydroclone underflow 60 may be collected, filtered, or screened 62 to remove larger particles, which would be collected for disposal in a landfill 64. The filtrate 66 from the screening step, which contains calcium chloride in solution, may be returned to the magnesium hydroxide production vessel 58 to minimize losses of chloride from the system. The screens 62 may be washed with water 67 and a mild hydrochloric acid solution 68 to resist clogging and provide a source of chloride ions to further compensate for chloride losses throughout the process. Alternatively, the filtrate 66 could be sent for waste water treatment and disposal if there is sufficient chlorine in the coal to compensate for chloride losses throughout the system.

The hydroclone overflow, referred to herein as the treated magnesium hydroxide slurry 70, may be diverted to a magnesium hydroxide purification unit 72. The purification unit 72 separates the calcium chloride solution 74 from the treated magnesium hydroxide slurry 70, leaving behind a high quality magnesium hydroxide product 76 or slurry. A portion of the magnesium hydroxide product 76 may be recirculated to the scrubber 4 for use as the magnesium hydroxide slurry 6. Additionally, a portion of the magnesium hydroxide product 76 may be recirculated to the oxidation unit 14 or used for pH control 22. Any excess magnesium hydroxide product 76 may be collected for sale or further use. Although the present invention is not limited to any particular concentration, the concentration of the magnesium hydroxide product 76 is preferably maintained relatively constant and if possible within the range of 50 to 60 percent magnesium hydroxide, to minimize the amount of water introduced to the scrubber with the slurry and to make it a more marketable product. If the concentration of the magnesium hydroxide product 76 is maintained constant, the magnesium sulfite/bisulfite blowdown 12 may be controlled as a ratio of the magnesium hydroxide slurry 6, making it unnecessary to frequently monitor the sulfite concentration in the scrubber.

The calcium chloride solution 74 produced from the purification unit 72 may receive further processing. The volume of this calcium chloride solution 74 may be more than double and possibly three times the volume of calcium chloride that was fed to the crystallization unit 30. The calcium chloride solution 74 may proceed to a concentration unit 78, where excess water 79 is removed. In a preferred embodiment, a vacuum pump 80 may be used to facilitate evaporation. Excess heat produced from the reactions in the oxidation unit 14 could be recovered with a heat exchanger 17 to assist with the concentration (evaporation of water) of the calcium chloride, further reducing energy costs. In addition, heat recovered from a heat exchanger 84 used to condense the water vapor 86 could be returned to the concentration unit 78 to further assist with the concentration of the calcium chloride solution. In one embodiment, a source of heat 77 could be supplied to the calcium chloride concentration unit 78 in the event recovery of heat from the process is impractical. This source of heat 77 could be in the form of steam from the boiler.

The calcium chloride stream 88 from the concentration unit 78 may be purified using hydrochloric acid 90 for pH adjustment, and the purified calcium chloride solution 89 may be recirculated back to the gypsum crystallization unit 30 as stream 32. The purification of the calcium chloride stream 88 should improve the quality of the final gypsum product 48. To achieve such purification, hydrochloric acid 90 may be injected into the calcium chloride stream 88 to lower the pH of this solution to about 6.0-7.0, thereby removing any remaining calcium or magnesium hydroxide and resisting scaling in the calcium chloride concentration unit 78. However, the pH adjustment may vary, and the desired pH of the final gypsum product 48 typically determines the pH control setpoint. The hydrochloric acid stream 90 provides a source of chloride to make up for losses in the system.

In a preferred embodiment, the concentration of calcium chloride in the purified calcium chloride stream 89 may range from about 200,000 to 400,000 mg/L. However, the present invention is not limited to any particular concentration of calcium chloride in this stream. The design of the gypsum crystallization unit 30 will determine the concentration of the purified calcium chloride stream 89. If the process requires removal of some chlorides, it is preferable to have a higher concentration of calcium chloride in this stream. The concentration of the stream can be easily controlled using the calcium chloride concentration unit 78.

If coal being burned in the boiler contains enough chlorine, there may be an excess of calcium chloride solution 92 that could be sold as another product of the process. This would also provide a means for removing the chlorides from the process without putting them to waste.

Any calcium chloride remaining in the magnesium hydroxide slurry 76 recirculated to the scrubber 4 or oxidation unit 14 will react to form either calcium sulfite or calcium sulfate. The calcium sulfite will be oxidized to calcium sulfate in the oxidation unit 14. This calcium sulfate will be removed in the magnesium sulfate purification unit 24. The calcium sulfate formed in the oxidation unit 14 could cause scaling requiring periodic cleaning of the unit.

An advantage of oxidizing the magnesium sulfite/bisulfite blowdown 12 to magnesium sulfate and recirculating it 15 to the scrubber 4 is that it reduces the amount of magnesium sulfate blowdown 20, thereby reducing the capital costs of the plant. Concentrating the magnesium sulfate reduces the size of capital equipment required down stream of the oxidation unit 14, making this process more attractive than other gypsum processes. For example, at an operating process temperature of about 125 degrees Fahrenheit, magnesium sulfate is soluble up to a concentration of over 500,000 ppm. The side stream blowdown could, theoretically, be reduced to 200 gpm or less. Oxidation could be performed in either the scrubber sump or the recirculation tank of the scrubber. However, the excess oxygen in the gas stream may cause unknown problems.

In alternative embodiments of the present invention, the system components may be modified or eliminated. For example, the magnesium purification unit 24 or the second belt wash 46 may be eliminated, which would reduce capital costs but may also reduce the quality of the gypsum that is produced. The oxidation unit 14 may also be eliminated, and oxidation of magnesium sulfite/bisulfite to magnesium sulfate may occur directly in the scrubber 4. To achieve such oxidation in the scrubber 4, air may be introduced along with the magnesium hydroxide slurry 6. While the present invention focuses on the use of "units" (e.g., the oxidation unit, magnesium sulfate purification unit, gypsum crystallization unit, etc.), it is to be understood that the present invention is not limited to any one unit for accomplishing the production of gypsum and magnesium hydroxide.

EXAMPLES

Several experiments were conducted to demonstrate the formation of gypsum using calcium chloride solution and magnesium sulfate, to determine the purity and pH of the gypsum, and to test the results of using highly concentrated solutions of magnesium sulfate and calcium chloride. An additional experiment was conducted to demonstrate that magnesium chloride reacts with calcium hydroxide to form magnesium hydroxide and calcium chloride.

Example 1

A 500 ml saturated solution of calcium chloride was prepared using demineralized water. A 3000 ml straight-sided beaker was used as the reaction vessel. The reaction vessel was filled to the 2000 ml mark with fines thickener overflow from a power station gypsum process. This solution contained approximately 45,000 mg/L of magnesium sulfate. A paddle type mixer was used to agitate the contents of the reaction vessel at 100 RPM. The pH of the solution was 6.60.

The calcium chloride solution was introduced to the reaction vessel in 10 ml increments. After adding 40 ml, fine particles began to form. The agitator was shut off to observe the crystal formation. As the solution slowed, the crystals began forming faster and getting larger.

Agitation started again at 40 RPM. The calcium chloride solution was introduced in 10 ml increments until 250 ml had been added. The crystallization continued to the point of being unable to see through the solution. The agitator was shut off, allowing the solids to settle. Once settled, the solids filled the beaker to the 625 ml mark on the 3,000 ml beaker. The final pH of the solution was 6.04.

As the gypsum solids concentration increased, the reaction rate between the magnesium sulfate and the calcium chloride appeared to increase and the particles grew larger. This is consistent with crystallization theory.

The solids were filtered through a No. 41 Whatman filter paper using vacuum filtration. The filtrate was clear. The beaker was rinsed with about 400 ml of demineralized water in order to transfer all of the gypsum to the filter funnel. After dewatering the gypsum, it was rinsed twice with 200 ml of demineralized water. The gypsum filtered easily. The solids were white and fluffy, and the particles appeared extremely small.

The solids were transferred to a pan for drying. Six grams of wet solids were removed for a moisture and purity test on the Arizona Instrument moisture and purity balance. The remaining solids were dried at 45 degrees Celsius for 2 hours. The Arizona Instrument test showed a free moisture content of 45% and a purity of 101.8%. Most likely the small size of the particles allowed them to retain moisture, resulting in the elevated moisture content. The small particle size also makes it more difficult to rinse the gypsum in the filter, thus leaving some calcium chloride salts behind in the gypsum. This salt will give a false high purity as indicated by a purity greater than 100%. If the gypsum was adequately rinsed, it is believed that the purity would be close to, but not exceed, 100%.

A pH test was performed on the dried solids. The solids were pulverized and 10 grams were mixed with 100 ml of demineralized water for 15 minutes in a 250 ml disposable beaker. The pH of the slurry after mixing was 7.3.

Example 2

A 300,000 mg/L solution of magnesium sulfate was prepared, along with a 300,000 mg/L solution of calcium chloride. 100 ml of the magnesium sulfate solution was transferred to a 500 ml beaker and stirred at about 100 RPM. The calcium chloride solution was introduced in 5 ml increments. After adding the first 5 ml, particles began forming. After adding 25 ml, the slurry appeared thick and the crystals were clumping. After adding 40 ml of the calcium chloride solution, the slurry was thick enough to form peaks. After adding 50 ml, the slurry was so thick it had to be mixed by hand. This slurry was filtered, leaving some magnesium sulfate unreacted.

The slurry was filtered through a Whatman #41 filter. The filtrate was clear with a pH of 6.08. The solids were rinsed with about 700 ml of deionized water and dried at 40 degrees Celsius for three hours. A purity test performed on an Arizona Instrument moisture balance gave a purity of 100.77%. The purity greater than 100% is a result of some magnesium sulfate and calcium chloride remaining in the solids.

Example 3

A 150,000 mg/L solution of magnesium sulfate with a pH of 6.92 was prepared, along with a 150,000 mg/L solution of calcium chloride with a pH of 6.66. 100 ml of the magnesium sulfate solution was transferred to a 500 ml beaker and stirred at about 100 RPM. The calcium chloride solution was introduced in 5 ml increments. After 10 ml of the calcium chloride solution were added, particles began forming. The thickness of the slurry increased as more calcium chloride was introduced, but the slurry continued to mix easily until the entire 100 ml was added. The pH of the slurry after adding the 100 ml of calcium chloride was 5.42.

The slurry was filtered through a Whatman # 41 filter, generating 110 ml of filtrate. The gypsum solids were rinsed with about 700 ml of deionized water. The solids appeared white. They were dried at 40 degrees Celsius for two hours. A purity test performed on an Arizona Instrument moisture balance showed a purity of 101.31%. A purity greater than 100% indicates that all of the magnesium chloride was not rinsed from the solids.

Example 4

A 200,000 mg/L solution of magnesium sulfate was prepared along with a 150,000 mg/L solution of calcium chloride. A small amount of magnesium hydroxide was introduced to the calcium chloride solution to increase its pH to 7.43. 100 ml of the magnesium sulfate solution were transferred to a 500 ml beaker and stirred at about 100 RPM. The calcium chloride solution was introduced in 5 ml increments. After adding 40 ml, the slurry became thick but could still be easily mixed. The calcium chloride solution was introduced in 5 ml increments until 125 ml had been added. After adding 125 ml, the slurry was thick but could still be easily mixed. The weight of the slurry produced was 234.2 grams. The volume was 210 ml.

The slurry was filtered through a # 41 Whatman filter. The pH of the filtrate was 7.07. The volume of filtrate was 140 ml. The solids were rinsed with about 1000 ml of deionized water and dried for 2 hours at 40 degrees Celsius.

Example 5

Saturated calcium chloride solution was added to 1000 mL of fines thickener overflow to produce a solution containing magnesium chloride. Excess calcium chloride was added to ensure the removal of magnesium sulfate. The following reaction occurred:

$$MgSO_4 + CaCl_2 \rightarrow MgCl_2 + CaSO_{4(s)} \quad (10)$$

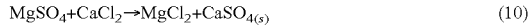

The resulting solution contained magnesium chloride with some calcium chloride and calcium sulfate solids. This solution was filtered through a No. 41 Whatman filter paper, and the filtrate was collected.

1000 mL of the filtrate was transferred into a 2000 mL beaker and placed on a stir plate. A pH probe was inserted into the solution. A 17% total solids lime slurry solution was prepared using analytical grade calcium hydroxide and demineralized water, and the solids were allowed to settle.

The initial pH of the magnesium chloride solution was 5.8. As the solution was mixed, the clear portion of the calcium hydroxide solution was added in 20 mL increments. The pH of the solution increased slowly. At a pH of 8.5, a fine precipitate began to form. The addition of the calcium hydroxide solution continued as before, and the pH continued to increase. At a pH of approximately 9.85, the increase in pH ended. The precipitate continued to form as more calcium hydroxide solution was added. After using up the clear portion of the calcium hydroxide solution the slurry was added to continue the reaction. As additional lime slurry was added, the pH of the solution increased slowly. After adding 900 mL of lime slurry, the solution was allowed to mix for 10 minutes. The resultant slurry was filtered through a No. 41 Whatman filter paper (25 micron). The solids were dried at 105 degrees Celsius for testing. The filtrate was clear, indicating that most of the solids formed were larger than 25 microns in size. However, the solids appeared very fine, and several filter papers were required to filter them.

The precipitation reaction proceeded as expected with an equivalence point of 9.85 to 9.90 being established. Two additional tests were performed with identical results.

The present invention provides methods and apparatus for treating flue gas containing sulfur dioxide using a scrubber, and more particularly relates to recovering gypsum and magnesium hydroxide products from the scrubber blowdown. The gypsum and magnesium hydroxide products are created using two separate precipitation reactions. Gypsum is crystallized when magnesium sulfate reacts with calcium chloride. Magnesium hydroxide is precipitated when magnesium chloride from the gypsum crystallization process reacts with calcium hydroxide. The process produces a high quality gypsum with a controllable pH and particle size distribution, as well as high quality magnesium hydroxide.

Whereas particular embodiments of this invention have been described above for purposes of illustration, it will be evident to those skilled in the art that numerous variations of the details of the present invention may be made without departing from the invention as defined in the appended claims.

What is claimed is:

1. An apparatus for recovering gypsum product and magnesium hydroxide product from flue gas containing sulfur dioxide, the apparatus comprising:
    a scrubber for removing sulfur dioxide from the flue gas and producing magnesium sulfite and magnesium bisulfite, wherein said apparatus is structured for oxidizing the magnesium sulfite and magnesium bisulfite by reaction with air to produce magnesium sulfate blowdown;
    a gypsum crystallization unit for reacting the magnesium sulfate blowdown with calcium chloride to produce gypsum slurry;
    a gypsum fines separation unit for removing gypsum fines from the gypsum slurry;
    a dewatering filter belt for washing the gypsum slurry after the gypsum fines are removed to produce gypsum product, a magnesium chloride filtrate, and a residual stream;
    a magnesium hydroxide production vessel for reacting the magnesium chloride filtrate with calcium hydroxide to produce magnesium hydroxide slurry;
    a grit removal unit for removing grit and unreacted calcium hydroxide from the magnesium hydroxide slurry to produce a treated magnesium hydroxide slurry; and
    a magnesium hydroxide purification unit for purifying the treated magnesium hydroxide slurry to produce a magnesium hydroxide product and a calcium chloride solution.

2. The apparatus of claim 1, wherein the magnesium sulfite and magnesium bisulfite are oxidized in an oxidation unit using air.

3. The apparatus of claim 2, wherein a stream of magnesium sulfate from the oxidation unit is recirculated to the scrubber.

4. The apparatus of claim 2, wherein pH of the magnesium sulfate blowdown is controlled with magnesium hydroxide in the oxidation unit.

5. The apparatus of claim 1, wherein the magnesium sulfite and magnesium bisulfite are oxidized in a scrubber using air.

6. The apparatus of claim 1, wherein pH of the magnesium sulfate blowdown is controlled by introducing additional magnesium hydroxide to the magnesium sulfate blowdown prior to the blowdown reacting with calcium chloride in the gypsum crystallization unit.

7. The apparatus of claim 1, wherein pH of the magnesium sulfate blowdown is adjusted to a pH ranging from about 6.0 to 8.0 prior to the magnesium sulfate blowdown reacting with calcium chloride in the gypsum crystallization unit.

8. The apparatus of claim 1, further comprising a magnesium sulfate purification unit for removing inert material from the magnesium sulfate blowdown prior to its reaction with calcium chloride in the gypsum crystallization unit.

9. The apparatus of claim 8, wherein the magnesium sulfate purification unit utilizes a method selected from the group consisting of a thickening, filtering, and centrifuge.

10. The apparatus of claim 1, further comprising a surge tank for controlling flow of the magnesium sulfate blowdown prior to its reacting with calcium chloride in the gypsum crystallization unit.

11. The apparatus of claim 1, wherein an excess of calcium chloride is fed to the gypsum crystallization unit for reaction with the magnesium sulfate blowdown.

12. The apparatus of claim 1, wherein the gypsum fines are recirculated to the gypsum crystallization unit.

13. The apparatus of claim 1, wherein the residual stream from the dewatering filter belt is recirculated to the scrubber.

14. The apparatus of claim 1, wherein the calcium hydroxide is provided in a slurry that contains at least 0.5 percent magnesium.

15. The apparatus of claim 1, wherein the calcium hydroxide is provided as lime that contains magnesium oxide.

16. The apparatus of claim 1, wherein the calcium hydroxide is provided as dolomitic lime.

17. The apparatus of claim 1, wherein the grit removal unit comprises a hydroclone.

18. The apparatus of claim 17, wherein underflow from the hydroclone is recirculated to the magnesium hydroxide production vessel.

19. The apparatus of claim 1, further comprising a calcium chloride concentration unit that removes water from the calcium chloride solution.

20. The apparatus of claim 1, wherein pH of the calcium chloride solution is adjusted using hydrochloric acid.

21. The apparatus of claim 1, wherein the calcium chloride solution is recirculated to the gypsum crystallization unit.

22. The apparatus of claim 1, wherein the gypsum product is collected for use or sale.

23. The apparatus of claim 1, wherein at least some of the magnesium hydroxide product is recirculated to the scrubber.

24. The apparatus of claim 1, wherein at least some of the magnesium hydroxide product is recirculated to the oxidation unit.

25. The apparatus of claim 1, wherein at least some of the magnesium hydroxide product is collected for use or sale.

26. The apparatus of claim 1, wherein quality of the gypsum product ranges from about 95 to about 100 percent.

27. The apparatus of claim 1, wherein quality of the gypsum product ranges from about 97 to about 100 percent.

28. The apparatus of claim 1, wherein pH of the gypsum product ranges from about 6.0 to 8.0.

29. The apparatus of claim 1, wherein particle size distribution of the gypsum product ranges from about 20 to 100 microns for about 95 percent of particles.

30. The apparatus of claim 1, wherein purity of the magnesium hydroxide product ranges from about 85 to 95 percent.

31. The apparatus of claim 1, wherein purity of the magnesium hydroxide product ranges from about 90 to 95 percent.

\* \* \* \* \*

UNITED STATES PATENT AND TRADEMARK OFFICE
CERTIFICATE OF CORRECTION

PATENT NO.        : 7,419,643 B1
APPLICATION NO.   : 11/656701
DATED             : September 2, 2008
INVENTOR(S)       : Dennis K. Jones It is certified that error appears in the above-identified patent and that said Letters Patent is hereby corrected as shown below:

Column 5, line 26, "$MgSO_3 + /\frac{1}{2}O_2 \rightarrow MgSO_4$" should be
--$MgSO_3 + \frac{1}{2}O_2 \rightarrow MgSO_4$--.

Signed and Sealed this

Tenth Day of February, 2009

JOHN DOLL
*Acting Director of the United States Patent and Trademark Office*